(12) United States Patent
Belleville et al.

(10) Patent No.: US 8,752,435 B2
(45) Date of Patent: Jun. 17, 2014

(54) MINIATURE HIGH SENSITIVITY PRESSURE SENSOR

(76) Inventors: Claude Belleville, Quebec (CA);
Sebastien Lalancette, St-Augustin-de-Desmaures (CA);
Nicolas Lessard, Quebec (CA)

( * ) Notice: Subject to any disclaimer, the term of this patent is extended or adjusted under 35 U.S.C. 154(b) by 266 days.

(21) Appl. No.: 13/415,514

(22) Filed: Mar. 8, 2012

(65) Prior Publication Data
US 2012/0227505 A1 Sep. 13, 2012

Related U.S. Application Data

(60) Provisional application No. 61/450,959, filed on Mar. 9, 2011.

(51) Int. Cl.
*G01L 9/00* (2006.01)
(52) U.S. Cl.
USPC .................................. 73/705; 73/715
(58) Field of Classification Search
CPC ...................................... G01L 9/0079
USPC .................................... 73/700–756
See application file for complete search history.

(56) References Cited

U.S. PATENT DOCUMENTS

| | | | | |
|---|---|---|---|---|
| 5,808,210 A | * | 9/1998 | Herb et al. | 73/862.59 |
| 2002/0043895 A1 | * | 4/2002 | Richards et al. | 310/328 |
| 2003/0019299 A1 | | 1/2003 | Horie et al. | |
| 2007/0227252 A1 | * | 10/2007 | Leitko et al. | 73/717 |
| 2008/0096271 A1 | * | 4/2008 | Zhou et al. | 435/287.1 |

FOREIGN PATENT DOCUMENTS

| | | |
|---|---|---|
| CA | 2599898 A | 9/2006 |
| WO | WO 9119965 A | 12/1991 |
| WO | WO 2007019676 A | 2/2007 |
| WO | WO 2009155716 A | 12/2009 |

OTHER PUBLICATIONS

International Search Report of PCT/CA2012/000211.
Written Opinion of PCT/CA2012/000211.

* cited by examiner

*Primary Examiner* — Andre Allen
(74) *Attorney, Agent, or Firm* — Benoît & Côté Inc.

(57) ABSTRACT

There is described a miniature fiber optic pressure sensor design where sensitivity around specific biased pressure is optimized. In an embodiment, the pressure sensor is a Fabry-Perot (FP) sensor which comprises a substrate; and a diaphragm mounted on the substrate. The diaphragm has a center and comprises: a first layer comprising a first material; and a second layer comprising a second material. The second layer forms a dot or a ring. The dot or ring is mounted on the first layer and is centered about the center of the diaphragm. The second material comprises internal pre-stresses to cause the center of the diaphragm (in the case of a dot) or the peripheral area about the center of the diaphragm (in the case of a ring) to camber away from the substrate upon relaxing the internal pre-stresses.

9 Claims, 9 Drawing Sheets

MINIATURE HIGH SENSITIVITY PRESSURE SENSOR

CROSS-REFERENCE TO RELATED APPLICATIONS

The present application claims priority under 35 U.S.C. §119(e) from U.S. provisional patent application No. 61/450,959, filed on Mar. 9, 2011, the contents of which are hereby incorporated by reference.

FIELD

The invention relates to pressure sensors, more specifically to miniature high sensitivity pressure sensors.

BACKGROUND

The use of pressure sensors for minimally invasive procedures requires increasingly smaller sensors. For example, a pressure sensor instrumented guidewire (Pressure Guidewire) for the assessment of the coronary fractional flow reserve (FFR) is highly demanding as it requires the smallest pressure sensor, while delivering high fidelity pressure measurements.

In the past few years, there has been an increasing number of fiber optic pressure sensors based on the use of a Fabry-Perot cavity. Fabry-Perot sensor can be made of a small diameter and can be made at a low cost as they can be produced using micromachining techniques (Microelectromechanical Systems=MEMS). It is herein worth noting that Fabry-Perot based pressure sensors are quite similar to capacitance based pressure sensors, where pressure measurement is accomplished by measuring the deflection of the diaphragm.

Fabry-Perot based pressure sensors are therefore considered as those having the best potential for numerous applications, and among others the best to suit the needs for catheter and guidewire tip pressure measurement. Numerous methods and designs were proposed for pressure sensors such as those described in U.S. Pat. Nos. 4,678,904 and 7,689,071.

As the size of prior art pressure sensor designs shrinks, Fabry-Perot or others, the sensitivity also diminishes, to a point where adequate resolution, stability and therefore accuracy, are no longer satisfactory.

It is indeed well known by those skilled in the art that as the size of a pressure sensor diaphragm is reduced, the deflection of the diaphragm relative to pressure is reduced as well. One can compensate for such a reduction of the diaphragm deflection relative to pressure by thinning such diaphragm. But this strategy has limitations as discussed below.

Figure 1:
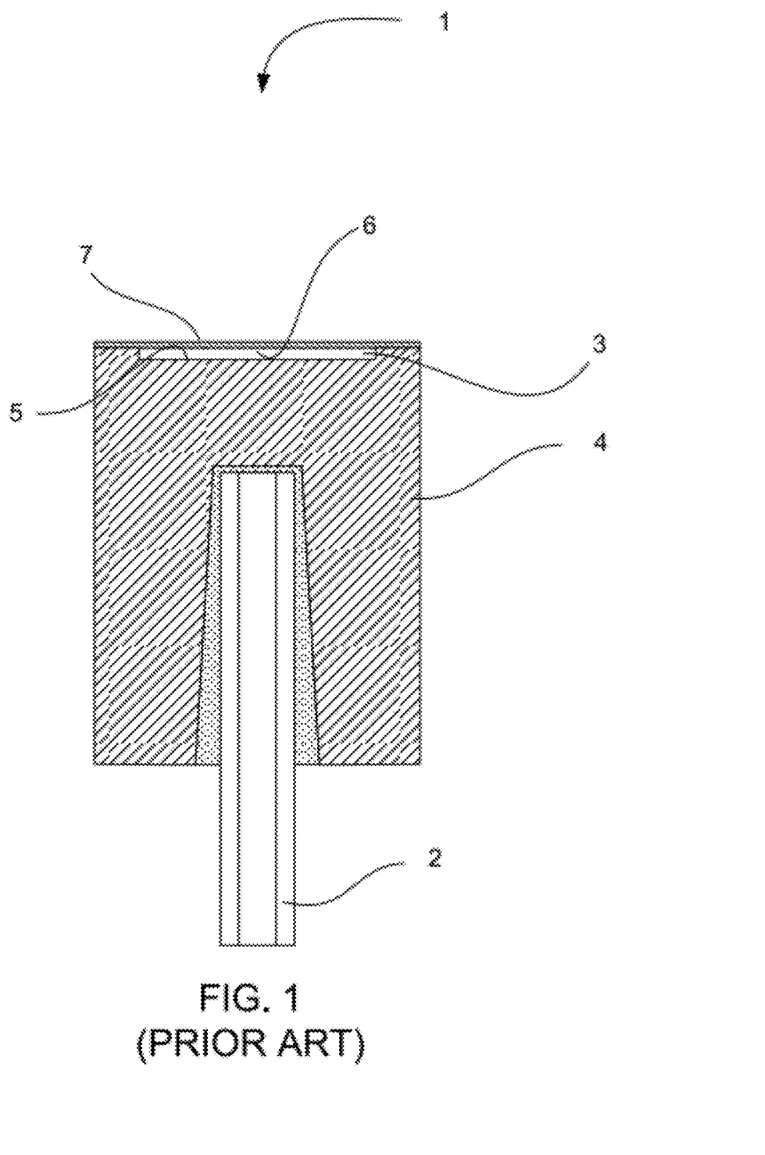
FIG. 1 is a schematic cross-sectional view of a prior art Fabry-Perot pressure sensor.

FIG. 1 shows a prior art construction of a Fabry-Perot sensor 1 for measuring pressure. A bi-directional fiber optic 2 guides the light signal toward a Fabry-Perot pressure chip (not numbered). The pressure chip is made of a glass substrate 4. One first partially reflective mirror 5 is deposited within a recessed cavity 3 performed on the top surface of the glass substrate 4. A diaphragm 7 is bonded or welded to the glass substrate 4, the internal surface of diaphragm 7 serving as a second mirror 6. Both mirrors 5, 6, spaced apart by a distance given by the depth of the recessed cavity 3, constitutes a Fabry-Perot cavity. The second mirror 6 bows toward first mirror 5 as function of an applied pressure, therefore changing the FP cavity length. The FP cavity length is an unambiguous function of pressure.

Figure 2:
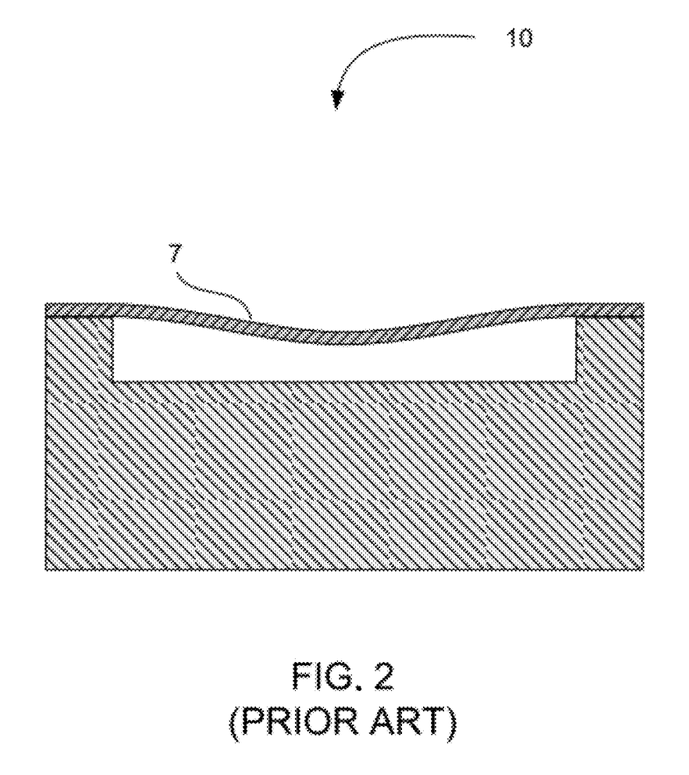
FIG. 2 is a schematic cross-sectional view of a prior art pressure sensor diaphragm deformed by applied external pressure.
Figure 3:
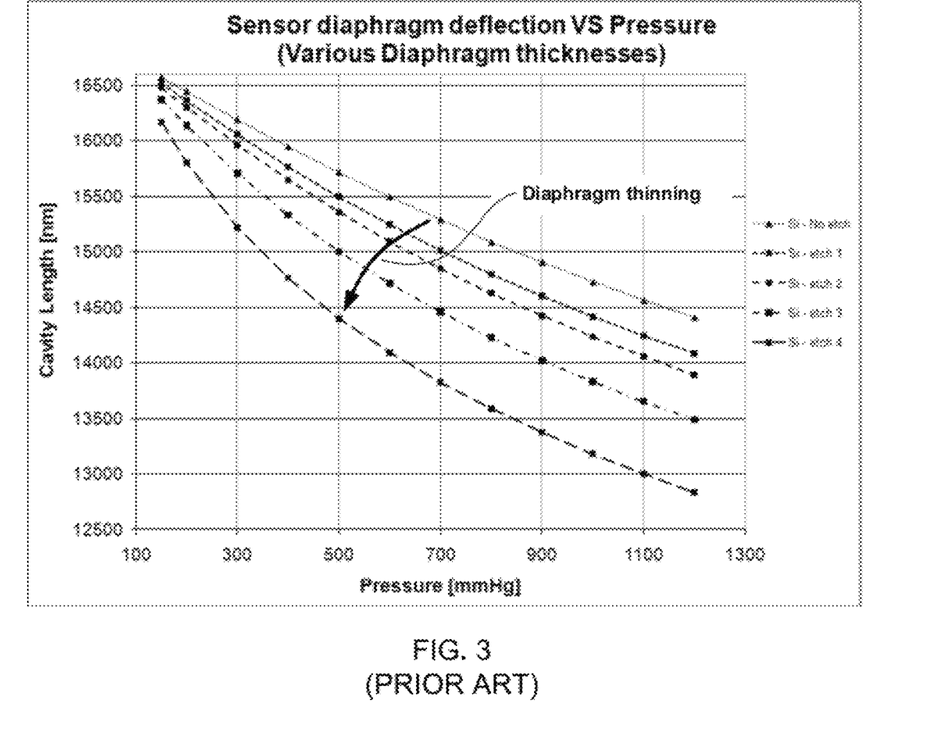
FIG. 3 is a graph illustrating the response of a prior art pressure sensor relative to applied pressure with various diaphragm thicknesses.

FIG. 2 shows the shape of a typical diaphragm 7 deformed as a result of applied pressure. As pressure increases, incremental deflection of diaphragm declines, i.e., the deflection of the diaphragm is non-linear function of the applied pressure. FIG. 3 shows a typical response of same pressure sensor having different diaphragm thicknesses. One can notice that as diaphragm thickness diminishes (from Si-No etch to Si-etch 4), although the sensitivity increases sharply when operating in lowest pressure range, i.e., around vacuum, the sensitivity saturates when operating in higher pressure range, around atmospheric pressure in this case. The increase of sensitivity of an absolute pressure sensor operating with a bias pressure is limited.

In addition to the above sensitivity limitation, the internal stress within the diaphragm increases as thickness of the diaphragm is reduced, potentially leading to diaphragm failure. Risk of diaphragm failure is obviously accentuated by a situation where the system operates with a bias pressure, such as atmospheric pressure. For medical applications that involve catheter tip pressure sensing, the pressure of interest is centered at atmospheric pressure (typically 760 mmHg). Reducing the thickness of a diaphragm increases the sensitivity around 0 mmHga, but increasing the sensitivity around 760 mmHga remains limited.

As a consequence of the above, one major drawback of current Fabry-Perot sensors as they are miniaturized, and similarly of current capacitance based pressure sensor designs, is their lack of adequate sensitivity to pressure. Accuracy, resolution and reliability then often become unsatisfactory, while other undesirable parasitic effects such as moisture drift and thermal effects appear to be amplified relative to pressure.

Accordingly, there is a need for a sensor design having an improved sensitivity for miniaturized sensors.

SUMMARY

The description provides a miniature fiber optic pressure sensor design where sensitivity around specific biased pressure is optimized.

In an embodiment, the pressure sensor is a Fabry-Perot (FP) sensor comprising a substrate; and a diaphragm mounted on the substrate. The diaphragm has a center and comprises: a first layer comprising a first material; and a second layer comprising a second material. The second layer forms a dot. The dot is mounted on the first layer and is centered about the center of the diaphragm. The second material comprises internal pre-stresses to cause the center of the diaphragm to camber away from the substrate upon relaxing the internal pre-stresses.

According to the embodiment comprising a dot, the first layer comprises an internal surface used for mounting on the substrate and an external surface opposite the internal surface, the second layer being mounted on the external surface and the second material being pre-stressed in compression. The internal compressive stresses of the second layer relax and move the diaphragm outward. The resulting shape of the diaphragm has the effect of increasing the pressure sensitivity of the sensor.

According to the embodiment comprising a dot and where the second material is pre-stressed in compression, the first material comprises silicon.

According to the embodiment comprising a dot and where the second material is pre-stressed in compression, the second material comprises $SiO_2$ on the silicon material of the first layer.

According to the embodiment comprising a dot and where the second material is pre-stressed in compression, the second material comprises one of chromium, aluminium, titanium, iron, gold, titanium oxide, tantalum oxide, silicon dioxide, zirconium oxide, aluminium oxide and silicon nitride on the silicon material of the first layer.

According to the embodiment comprising a dot, the first layer comprises an internal surface used for mounting on the substrate, the second layer being mounted on the internal surface and the second material being pre-stressed in tension.

According to the embodiment comprising a dot and where the second material is pre-stressed in tension, the first material comprises silicon.

According to the embodiment comprising a dot and where the second material is pre-stressed in tension, the second material comprises chromium on the silicon material of the first layer.

According to the embodiment comprising a dot and where the second material is pre-stressed in tension, second material comprises one of chromium, aluminium, titanium, iron, gold, titanium oxide, tantalum oxide, silicon dioxide, zirconium oxide, aluminium oxide and silicon nitride of the first layer.

According to another embodiment, the pressure sensor is a Fabry-Perot (FP) sensor comprises a substrate; and a diaphragm mounted on the substrate. The diaphragm has a center and comprises: a first layer comprising a first material; and a second layer comprising second material. The second layer forms a ring. The ring is mounted on the first layer and is centered about the center of the diaphragm. The second material comprises internal pre-stresses to cause a peripheral area about the center of the diaphragm to camber away from the substrate upon relaxing the internal pre-stresses.

According to the embodiment comprising a ring, the first layer comprises an internal surface used for mounting on the substrate and an external surface opposite the internal surface, the second layer being mounted on the external surface and the second material being pre-stressed in tension.

According to the embodiment comprising a ring and the second material is pre-stressed in tension, the first material comprises silicon.

According to the embodiment comprising a ring and where the second material is pre-stressed in tension, the second material comprises chromium on the silicon material of the first layer.

According to the embodiment comprising a ring and where the second material is pre-stressed in tension, the second material comprises one of chromium, aluminium, titanium, iron, gold, titanium oxide, tantalum oxide, silicon dioxide, zirconium oxide, aluminium oxide and silicon nitride on the silicon material of the first layer.

According to the embodiment comprising a ring, the first layer comprises an internal surface used for mounting on the substrate, the second layer being mounted on the internal surface and the second material being pre-stressed in compression.

According to the embodiment comprising a ring and the second material is pre-stressed in compression, the first material comprises silicon.

According to the embodiment comprising a ring and the second material is pre-stressed in compression, the second material comprises $SiO_2$ on the silicon material of the first layer.

According to the embodiment comprising a ring and the second material is pre-stressed in compression, the second material comprises one of chromium, aluminium, titanium, iron, gold, titanium oxide, tantalum oxide, silicon dioxide, zirconium oxide, aluminium oxide and silicon nitride on the silicon material of the first layer.

According to an aspect, the sensitivity of miniature Fabry-Perot or capacitance pressure sensors is advantageously increased by way of the addition of internally pre-stressed material deposited, grown or otherwise present on the diaphragm, and where upon relaxing such internally stressed material induces a change in the shape of the diaphragm such that the sensitivity in presence of a bias pressure increases.

DETAILED DESCRIPTION

In the following description of the embodiments, references to the accompanying drawings are by way of illustration of an example by which the invention may be practiced. It will be understood that other embodiments may be made without departing from the scope of the invention disclosed.

For a pressure sensor such as the one shown in FIG. 1, applied pressure is obtained by measuring the deflection of the diaphragm 7. The sensitivity of such a sensor is given by the deflection of the diaphragm relative to the applied pressure. The more the diaphragm deflects, better is the sensitivity.

It has been said that the sensitivity of an absolute pressure sensor working with a bias pressure range (pressure range offset from vacuum) can be improved by thinning the diaphragm. But FIG. 3 also shows that for a given diaphragm thickness, no more sensitivity improvement is possible even for thinner diaphragms. It is noted that the sensitivity at low pressure increases as the diaphragm becomes thinner, but there is no such improvement of sensitivity at higher pressure, for e.g. at 760 mmHg. For a given pressure sensor diaphragm diameter working at a given bias pressure range, there exists a maximum sensitivity that can hardly be exceeded.

One method for increasing the sensitivity of such pressure sensor is to reposition the diaphragm to the position that would exist if there was no such bias pressure. One way of achieving this goal would be to fill the internal cavity of the sensor with a gas at the same pressure as bias pressure, atmospheric pressure for catheter tip applications, such that differential pressure would vanish at said bias pressure. However, having the internal cavity filled with a gas, instead of being under vacuum, makes the sensor very sensitive to temperature. For example, if at atmospheric pressure, the gas pressure within the internal cavity of a pressure sensor would increase by 44 mmHg for a temperature rise from 20° C. to 37° C.

Figure 4:
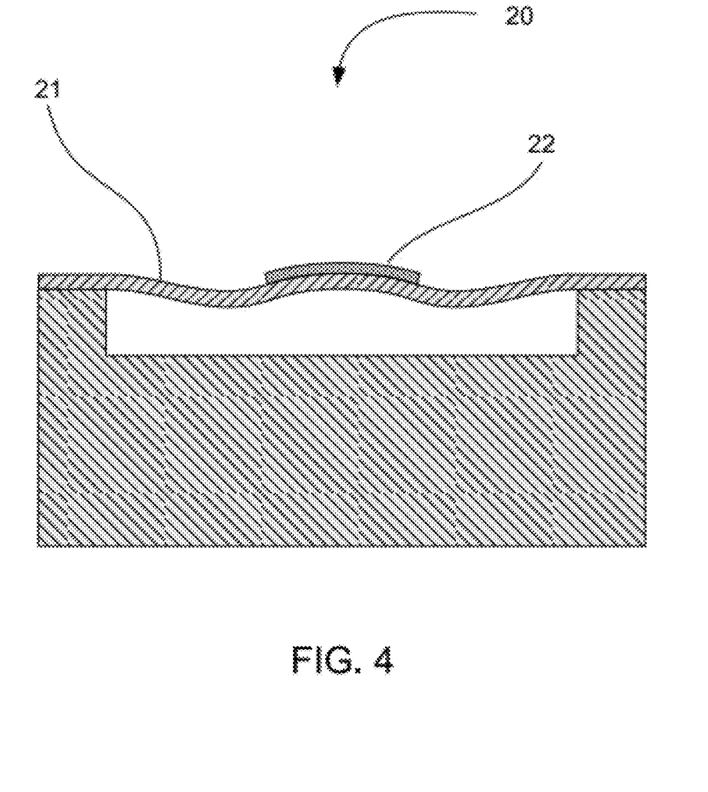
FIG. 4 is a cross-sectional view of a pressure sensor having an externally-mounted centrally-positioned pre-stressed dot diaphragm for diaphragm pressure biasing.

The embodiment shown in FIG. 4 consists in repositioning the diaphragm close to its original position by inducing a tensile stress on the external surface of the diaphragm such that it moves upward to an optimal position. A thin layer of expended material 22, provided by having such a layer releasing internal compressive stresses, located on the central portion of the external surface of the diaphragm 21 would serve this goal.

Figure 5:
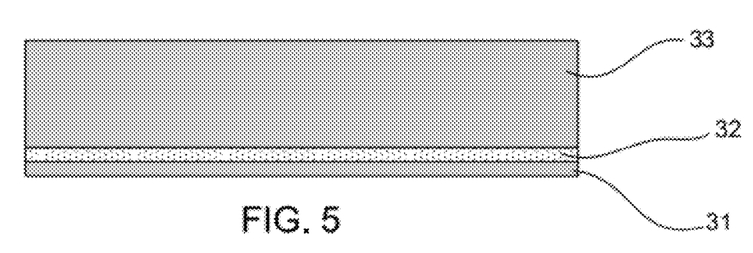
FIG. 5 is a cross-sectional view of a Silicon-On-Insulator substrate.

FIG. 5 to FIG. 8 illustrate one method of making such a pressure sensor with high pressure sensitivity. The Fabry-Perot pressure sensor diaphragm can be made using a Silicon-On-Insulator (SOI) as illustrated in FIG. 5. An SOI is made of a handle 33, which is a thick portion of silicon. The handle 33 is usually released, i.e., removed, once the sensor is completed. The silicon device 31 is the portion of the SOI that constitutes the diaphragm. It is separated from the handle by a layer of silicon dioxide ($SiO_2$) 32. The $SiO_2$ layer 32 allows easy releasing of the diaphragm from the handle as there are chemicals for preferentially etching silicon over silicon dioxide.

The manufacturing process of SOI substrates involves the thermal growth of the $SiO_2$ layer 32 at a fairly high temperature. Considering the temperature at which the $SiO_2$ layer 32 is grown and the difference in the coefficient of thermal expansion between $SiO_2$ and the opposite silicon device 31 ($0.5 \times 10^{-6}$ and $2.7 \times 10^{-6}$ at room temperature respectively), it becomes apparent that once at room temperature the $SiO_2$ 32 will be subject to significant compressive stresses. Similarly, the silicon device 31 will be subject to opposite stresses, i.e., tensile stresses.

Figure 6:
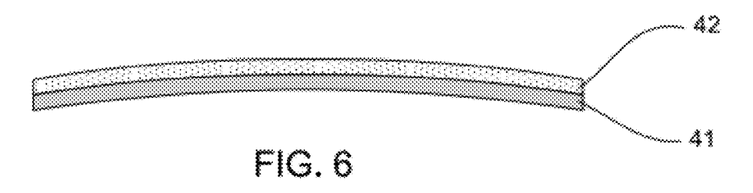
FIG. 6 is a cross-sectional view of the deformation encountered by layers of $SiO_2$ and a silicon device released from a Silicon-On-Insulator (SOI) handle.
Figure 7:
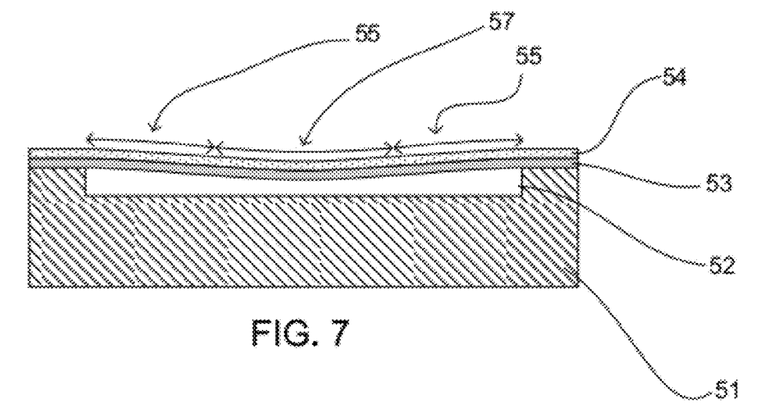
FIG. 7 is a cross-sectional view of the pressure sensor with a diaphragm made with both silicon device and $SiO_2$ layers.

Now referring to FIG. 6, if both the silicon device 41 and the $SiO_2$ layer 42 were released from the handle, one would notice a deflection of the remaining layers. This behavior is similar to a bimetal, where the composite material curves to relax the stresses within the layers. $SiO_2$ layer 42, being under compressive stress, wants to expand while silicon device 41, being under tensile stress, wants to contract.

When using an SOI to build a Fabry-Perot pressure sensor (FIG. 7), the whole SOI is typically joined to glass substrate 51 by way of anodic bonding, where Fabry-Perot cavities 52 are first etched into the surface. After the SOI is bonded to the glass substrate, the handle 33 is removed by grinding and etching processes as well known by those skilled in the art. The sensor is left with a diaphragm made of the silicon device layer 53 and the $SiO_2$ layer 54. One may expect the diaphragm to move up as a result of the bimetal behavior of the diaphragm as shown by FIG. 6, but this does not take into account the external bias pressure. Stresses on the external surface of a deflected diaphragm are not purely tensile stresses. The central portion 57 of the diaphragm is in compression, while the edge portion 55 is in tension. The relaxation of the stresses internal to the $SiO_2$ layer 54 and silicon device layer 53 moves the central portion 57 outward as expected, but it moves the edge portion 55 inward. Those two forces counter balance each others to a large extent. The end result being a diaphragm not moving back to its original position as desired.

Figure 8:
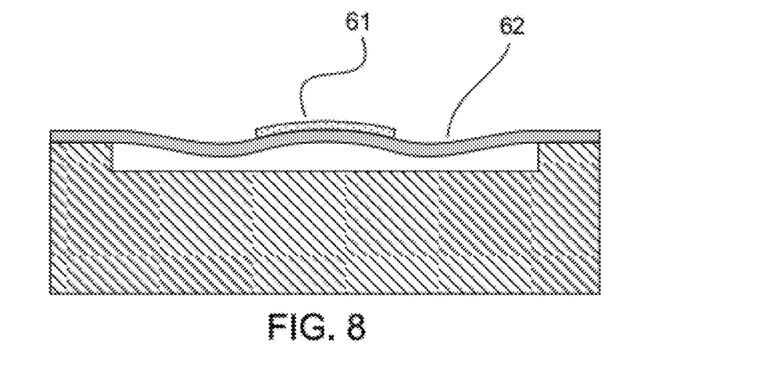
FIG. 8 is a cross-sectional view of a pressure sensor with a diaphragm made with silicon device layer and a central $SiO_2$ dot on the external surface.

The above counter balancing effect can be eliminated by removing the edge portion 55 of the $SiO_2$ layer 54 that contributes to moving the diaphragm inward, leaving in place only the central portion 57 that pulls the diaphragm outward. FIG. 8 illustrates the same pressure sensor, with the diaphragm moved back to an optimal position. The central $SiO_2$ dot portion 61 is left intact over the external surface of silicon diaphragm 62, while the edge portion is removed by way of preferential etching as known by those skilled in the art.

Figure 9:
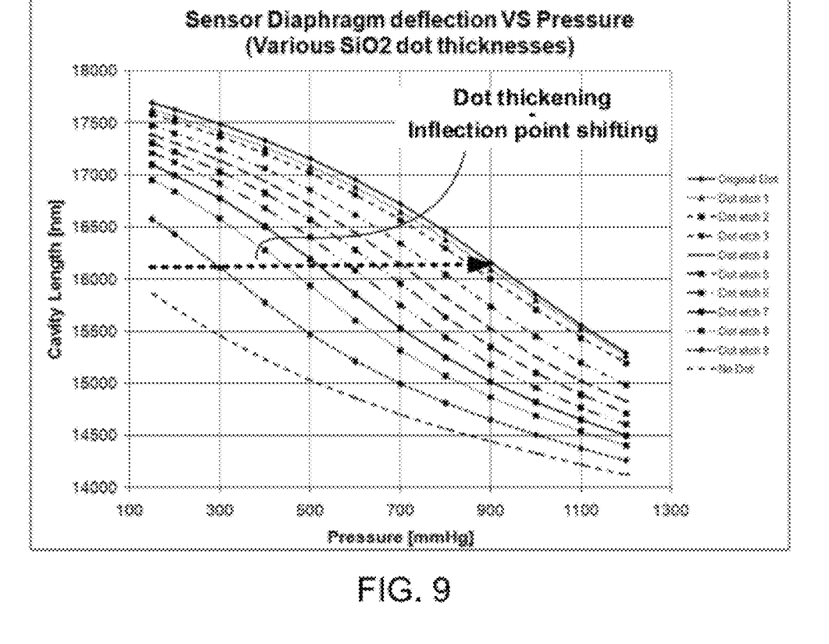
FIG. 9 is a graph illustrating pressure sensor response curves for various $SiO_2$ dot thicknesses (thick diaphragm)
Figure 10:
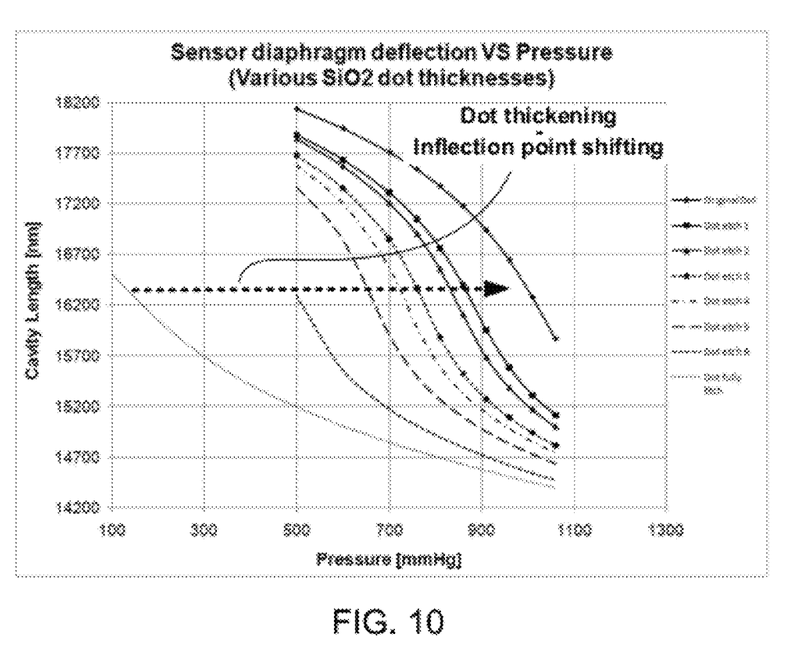
FIG. 10 is a graph illustrating pressure sensor response curves for various $SiO_2$ dot thicknesses (thin diaphragm)

It is understood that optimal designs are obtained after adjustment of various parameters. FIGS. 9 and 10 illustrate the sensitivity of two pressure sensors having: 1) the same diaphragm diameter; 2) a different diaphragm thickness, where sensor of FIG. 9 has a thicker diaphragm; and 3) a $SiO_2$ dot which thickness is varied.

Figure 11:
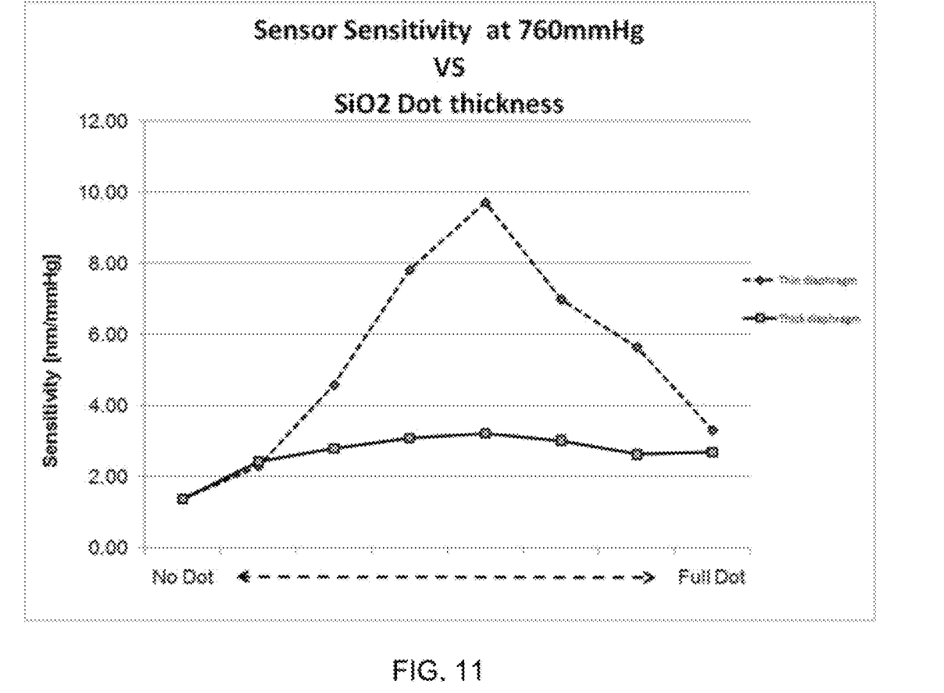
FIG. 11 is a graph illustrating pressure sensitivity of two different sensors at 760 mmHg for various $SiO_2$ dot thicknesses.

FIG. 11 gives the slope of response curves of FIGS. 9 and 10 around 760 mmHg. The sensitivity of both pressure sensors, i.e., both thin and thick diaphragm, at 760 mmHg is measured as being 1.36 nm/mmHg when no dot is present. So no sensitivity improvement resulting from thinning the diaphragm was possible. On the other hand, maximum sensitivity for sensor with thin diaphragm and optimal $SiO_2$ dot thickness is as high as 9.7 nm/mmHg, while it reaches 3.2 nm/mmHg for sensor with a thicker diaphragm. This compares advantageously with a sensitivity of 1.36 nm/mmHg without the dot.

Maximum sensitivity occurs in a limited region of the pressure range. In fact, the $SiO_2$ dot has the effect of sliding the sensor response curve of sensor without $SiO_2$ dot toward higher pressure, or said otherwise the sensor response curve is become biased toward larger pressure. Without a $SiO_2$ dot, the response of the sensor contains an inflexion point at 0 mmHg, where the diaphragm is flat. The response of the sensor for negative pressures, i.e., for situations where pressure is higher inside the internal cavity, is symmetrical. In FIGS. 9 and 10, it is the whole response curve that shifts toward higher pressure, with the inflexion point moving toward higher pressure as thickness of $SiO_2$ dot increases. Said otherwise, the presence of such a pre-stressed dot induces a bias to the pressure sensor that brings maximum sensitivity to a point that corresponds to actual bias pressure.

It has been shown that pressure sensor sensitivity can be increased by biasing the diaphragm. The diaphragm is biased by adding a dot at the center of the external surface of the diaphragm, the dot being pre-stressed in compression. Upon relaxing such internal compressive stresses, the diaphragm bows outward with the result of an increased sensitivity. Similarly, one can bias the diaphragm by adding a dot on the center of the internal surface of the diaphragm, considering the dot is pre-stressed in tension.

Figure 12:
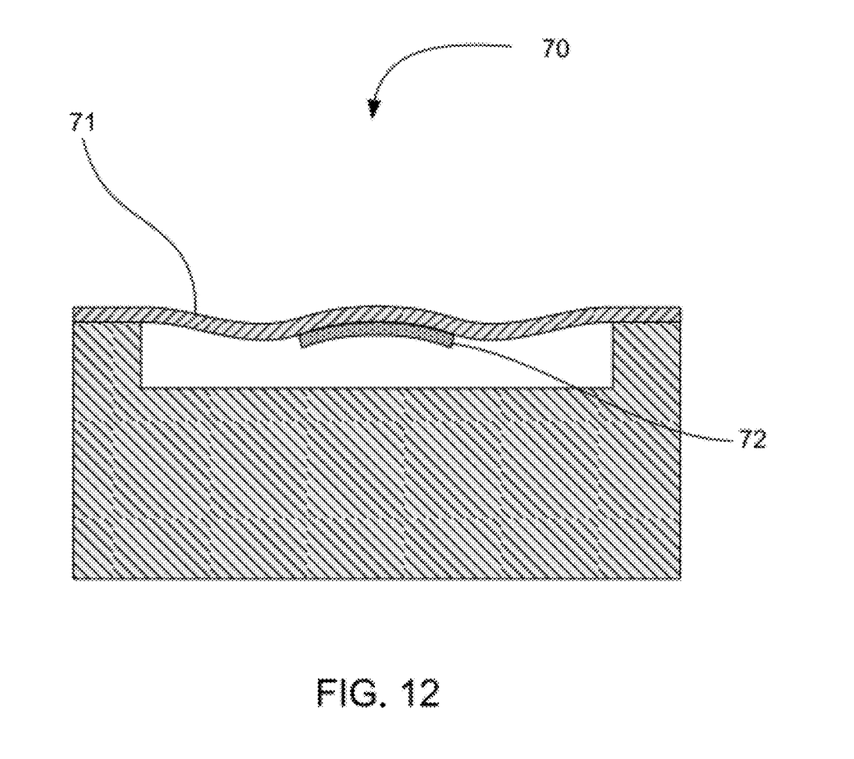
FIG. 12 is a cross-sectional view of a pressure sensor having an internally-mounted centrally-positioned pre-stressed dot diaphragm for diaphragm pressure biasing.

To this effect, FIG. 12 shows a FP sensors 70 where the diagram is repositioned close to its flat position by inducing a compressive stress on the internal surface of the diaphragm such that it moves upward to an optimal position. A thin layer of material 72 exhibiting internal tensile stresses and located on the central portion of the internal surface of the diaphragm 71 would serve this goal. Materials of interest that may be deposited or grown to exhibit such internal tensile stresses include various materials such as chromium, aluminium, titanium, iron, gold, titanium oxide, tantalum oxide, silicon dioxide, zirconium oxide, aluminium oxide and silicon nitride.

Figure 13:
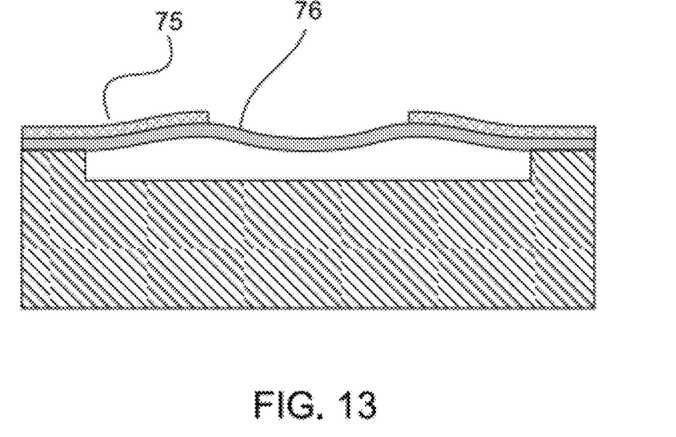
FIG. 13 is a cross-sectional view of a pressure sensor with a diaphragm made with silicon and a ring having internal tensile stresses located on the peripheral section of the external surface for diaphragm biasing.
Figure 14:
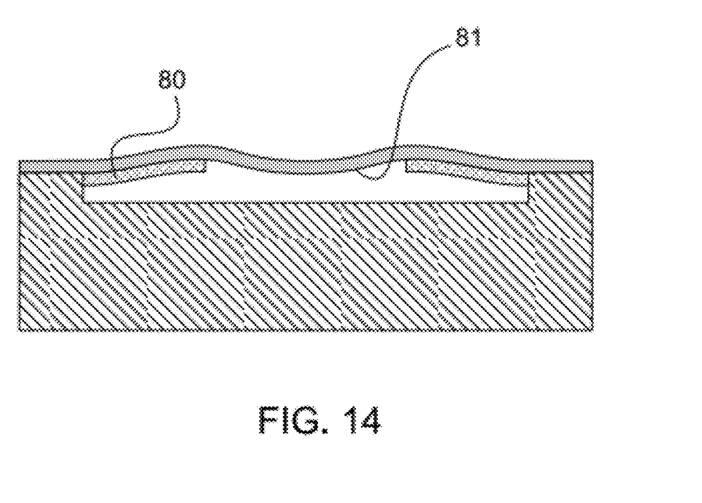
FIG. 14 is a cross-sectional view of a pressure sensor with a diaphragm made with silicon and a ring having internal compressive stresses located on the peripheral section of the internal surface for diaphragm biasing.

Similar designs may also involve having a pre-stressed layer of material deposited or grown on the peripheral edge section 55 of the diaphragm, therefore configured as a ring shape. As shown in FIG. 13, a layer with internal tensile stresses 75 would deliver similar results if deposited or grown on the peripheral section of the external surface 76 of the diaphragm, and inversely FIG. 14 shows a layer with internal compressive stresses 80 deposited or grown on the peripheral section of the internal surface 81 of the diaphragm would deliver similar results.

The embodiments of the present invention were exemplified using the compressive stresses developed within the $SiO_2$ of layer of a Silicon-On-Insulator (SOI) wafer during fabrication of the wafer. It is however understood that other grown or deposited thin layers of materials having internal stresses after deposition or growth or other post processing methods would serve the same objectives, For example, chromium, aluminium, titanium, iron, gold, titanium oxide, tantalum oxide, silicon dioxide, zirconium oxide, aluminium oxide and silicon nitride are among the materials that can be deposited with internal stresses.

Although the present invention has been described hereinabove by way of specific embodiments thereof, it can be modified, without departing from the spirit and nature of the subject invention as defined herein.

The invention claimed is:

1. A Fabry-Perot (FP) sensor comprising:
a substrate; and
a diaphragm mounted on the substrate, the diaphragm having a center and comprising:
  a first layer comprising a first material; and
  a second layer comprising a second material, the second layer forming one of a dot and a ring;
wherein:
  if the second layer comprises a dot, the dot is mounted on the first layer and centered about the center of the diaphragm, the second material comprises internal pre-stresses to cause the center of the diaphragm to camber away from the substrate upon relaxing the internal pre-stresses; and
  if the second layer comprises a ring, the ring is mounted on the first layer and centered about the center of the diaphragm, the second material comprises internal pre-stresses to cause a peripheral area about the center of the diaphragm to camber away from the substrate upon relaxing the internal pre-stresses.

2. The FP sensor of claim 1, wherein the first layer comprises an internal surface used for mounting on the substrate and:
  if the second layer comprises a dot, the first layer further comprises an external surface opposite the internal surface, the second layer being mounted on the external surface; and
  if the second layer comprises a ring, the second layer is mounted on the internal surface,
wherein the second material is pre-stressed in compression.

3. The FP sensor of claim 2, wherein the first material comprises silicon.

4. The FP sensor of claim 3, wherein the second material comprises $SiO_2$ on the silicon material of the first layer.

5. The FP sensor of claim 3, wherein the second material comprises one of chromium, aluminium, titanium, iron, gold, titanium oxide, tantalum oxide, zirconium oxide, aluminium oxide and silicon nitride on the silicon material of the first layer.

6. The FP sensor of claim 1, wherein the first layer comprises an internal surface used for mounting on the substrate and:
  if the second layer comprises a dot, the second layer is mounted on the internal surface; and
  if the second layer comprises a ring, the first layer further comprises an external surface opposite the internal surface, the second layer being mounted on the external surface,
wherein the second material is pre-stressed in tension.

7. The FP sensor of claim 6, wherein the first material comprises silicon.

8. The FP sensor of claim 7, wherein the second material comprises chromium on the silicon material of the first layer.

9. The FP sensor of claim 7, wherein the second material comprises one of aluminium, titanium, iron, gold, titanium oxide, tantalum oxide, silicon dioxide, zirconium oxide, aluminium oxide and silicon nitride on the silicon material of the first layer.

* * * * *